Feb. 24, 1959 R. C. DAVIS 2,874,957
VEHICLE SUSPENSION
Filed Jan. 17, 1956
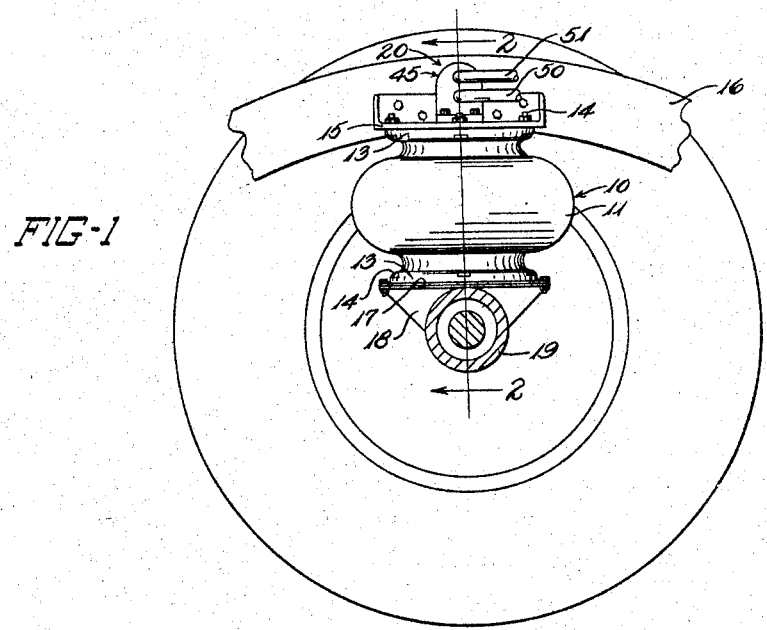
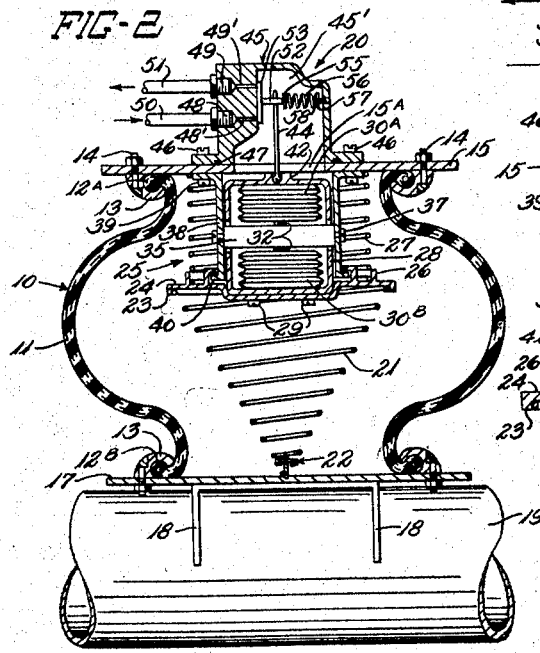
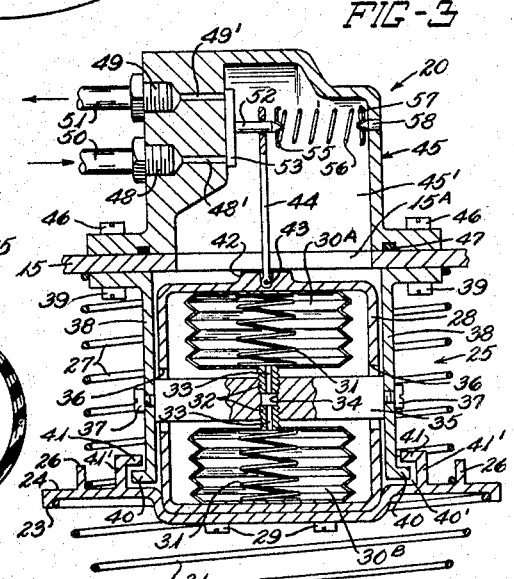
INVENTOR.
RALPH C. DAVIS
BY
W. A. Fraser
ATTY.

United States Patent Office 2,874,957
Patented Feb. 24, 1959

2,874,957

VEHICLE SUSPENSION

Ralph C. Davis, Akron, Ohio, assignor to The Firestone Tire & Rubber Company, Akron, Ohio, a corporation of Ohio Application January 17, 1956, Serial No. 559,567

6 Claims. (Cl. 267—65)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

In addition to controlling the supply and exhaust of air to and from an air spring, a satisfactory valve control means must embody therein an adjustable time delay so that momentary alteration of the static load on the suspension system, such as would be encountered during normal axle movement due to road irregularities, will not cause the valve to supply or exhaust air. This time delay feature is often referred to as "damping" and preferably is adjustable over a time range of from 1 to 20 seconds, as determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a novel time delay or "damping" feature, and is operative under extremes of temperature, humidity and other environmental conditions.

A further object is to provide a novel valve and control means for a vehicle air spring suspension, embodying therein a novel adjustable time delay or damping component to prevent excessive operation of the valve, which is liquid operated, simple in construction, and which eliminates all levers, cranks and rotating bearings.

A further object is to provide a novel liquid operated time delay or damping mechanism for use with an air spring control valve. These and other objects will be apparent in view of the following detailed description of the invention considered with the attached drawing.

In the drawing:

Fig. 1 is a vertical sectional view through a vehicle axle showing in elevation a portion of the vehicle equipped with a pneumatic suspension system according to the invention;

Fig. 2 is a longitudinal sectional view, taken substantially on line 2—2 of Fig. 1, through an air spring bellows and valve means therefor; and Fig. 3 is an enlarged sectional view, similar to a portion of Fig. 2, showing the valve means and operating means therefor according to the invention.

In the present invention, a ride control valve means, including a damping means and an air supply and exhaust control means, as described in detail hereinafter, is placed within and longitudinally of a conventional air spring bellows of multiply rubber and cord construction, indicated generally by the numeral 10. The air spring 10 is preferably formed with one or more convoluted portions 11 and has reinforced bead portions 12A and 12B at the upper and lower ends thereof. Only one air spring has been shown in connection with this invention, but it will be understood that the invention may be utilized with as many air springs as are required on a vehicle.

The upper bead 12A of the air spring is hermetically fastened by a suitable clamp ring 13 and bolts 14 to the undesirable of a horizontal transverse member 15 constituting a portion of the vehicle frame. The member 15 is securely affixed at either end to longitudinal frame members 16. The lower bead 12B is also hermetically fastened by a similar clamp ring 13 and bolts 14 to the upperside of a plate 17 which is securely affixed to a bracket 18 on the axle housing 19 of the vehicle road gear. The arrangement is such that an inflatable and deflatable air chamber is formed within the air spring 10, capable of holding air under substantial pressures to provide an air cushion for the vehicle. One mode of interposing an air spring between a vehicle frame and road gear has been shown and described. It will be understood, however, that the principles of the invention are applicable to air springs interposed in other ways between the frame and road gear.

Referring to Fig. 2, the ride control valve and operating means therefor, which is indicated in its entirety by the numeral 20, includes a coiled compression actuating spring 21, which is preferably but not necessarily, conical, and which is arranged vertically and medially within the air spring 10, with its smaller and lower end secured by an adjustable clamp 22 to the lower bead plate 17. Referring to Fig. 3, the upper and larger end of the spring 21 is engaged and held within a depending annular flange 23 formed on a dished, annular base plate 24, of the time delay or damping mechanism, indicated generally by the numeral 25.

On the upperside of the base plate 24, radially inwardly of flange 23, is a raised annular flange 26 which engages and holds the lower end of a coiled, compression, preferably cylindrical, calibrating spring 27, also arranged vertically and medially within the air spring 10. The upper end of the spring 27 is engaged with the underside of the frame member 15. The opposing actions of the springs 21 and 27 on the base plate 24, will be discussed later.

A metallic housing 28, positioned substantially within spring 27 and having a substantially rectangular cross-section, has its lower end fastened by bolts 29 to the upperside of the base plate 24, in the dished portion of the latter. Thus, motion imparted to the base plate, either up or down, by the opposed springs 21 and 27, is transmitted to the housing 28. Located within the housing 28, in such a manner that movement of their outer ends is confined by the housing, is a pair of opposed, liquid filled, flexible, expansible chambers or bellows 30A and 30B, of suitable metallic, reinforced rubber and fabric, or formed plastic construction, each having a small compression spring 31 therein, for a purpose to be described. The chambers 30A and 30B are identical and the inner end of each chamber is provided with a threaded nipple 32, at least one of which has a small diameter orifice 33 therein, which is threaded into a receiving bore 34 of a crosshead member 35. The two chambers 30A and 30B are completely filled with a suitable liquid such as a hydraulic brake fluid, which liquid also fills the nipples 32 and the bore 34 in the crosshead so as to form a hermetically sealed liquid system within the expansible chambers. As will be later explained, the operation of the time delay mechanism of the valve control means involves the transfer of liquid from one expansible chamber to the other, and the size of orifices 33 determines the rate of such liquid transfer.

Intermediate its ends, the housing 28 is provided on opposite sides with a slot 36 of greater length than the width of crosshead 35, and the latter extends laterally therethrough. Each end of the crosshead is secured by a bolt 37 to one of a pair of spaced brackets 38, intermediate the ends of the latter, which brackets depend from the frame member 15 and are fastened thereto by the bolts 39. By virtue of the elongated slots 36, limited vertical, relative movement is possible between housing 28, and crosshead 35 with its attached chambers 30A and 30B, which movement will be referred to later. The lower end of each bracket 38 has an outwardly directed lateral flange 40 that extends into the space 40' which is provided between the upper surface of base plate 24 and an inwardly directed lateral flange 41 formed on the upper end of vertical extensions 41' on the upper surface of plate 24. The space 40' permits limited relative, vertical movement between base plate 24 and anything movable with it, and brackets 38 and anything movable with the latter. This movement will also be referred to later.

The upper end of the housing 28 is provided with a boss 42 having a small pin 43 or other suitable fastening means for securing thereto the lower end of a valve actuating rod 44. The rod 44 extends upward from the housing and through an opening 15A provided in the frame member 15, into the interior of the valve housing, indicated generally by the numeral 45.

The valve housing 45 contains an air chamber 45' that communicates with the air chamber in the air spring 10, and the housing is fastened to the upper side of the frame member 15 by bolts 46 and hermetically sealed with an O-ring 47. Housing 45 is provided with an air supply fitting 48 that communicates with an inlet port 48' leading to air chamber 45', and an air exhaust or vent fitting 49 that communicates with a similar exhaust port 49'. Fitting 48 is connected by suitable flexible piping 50 to a remotely located supply of air under pressure, and a conventional check valve (not shown) is located in the supply line so that air cannot back out. The exhaust fitting is connected by suitable piping 51 to the atmosphere.

The upper end of the actuating rod 44 is secured to a horizontal valve stem 52 of a vertically slidable disc valve 53 which normally covers both of the ports 48' and 49' with sufficient overlap of the ports so that the time delay feature, as discussed later, be permitted to function, and selectively controls passage of air, through these ports into and out of the air spring 10. Upward movement of valve 53 uncovers the inlet port while downward movement uncovers the exhaust port. The inner end of the valve stem 52 is pointed so as to facilitate engagement within a tapered cup 55 on one end of a small compression spring 56, the other end of which has a similar tapered cup 57 which engages a pointed stud 58 on the interior wall of housing 45, opposite to ports 48' and 49'. Spring 56 has a normal bias tending to hold valve 53 tightly against the opposite wall of housing 45, but this spring will not interfere with the limited vertical movements of the valve which are required to uncover and cover the inlet and outlet ports.

The operation of the valve and control means is as follows:

Let us assume that the normal static load on the vehicle suspension requires the air springs to be inflated to a pressure of about 50 lbs per sq. in., in which condition the valve and its control means are in the position shown in Figs. 2 and 3, with ports 48' and 49' closed, with crosshead 35 midway of slots 36 in housing 28, and with flanges 40 midway of the spaces 40'. This normal position of the operating parts is brought about because the springs 21 and 27 are so designed that at this time the forces exerted by these springs in opposite directions against the base plate 24 exactly counteract or balance each other. We now want to increase the static load, for example, by adding merchandise or passengers to the vehicle.

As the load is increased, the upper frame members 15 and 16 move downwardly toward the axle housing 19, causing the air spring 10 to contract. During the first part of this downward movement of the upper frame members, the valve and all of its control mechanism including the damping or time-lag means, also moves downwardly, and spring 21 is compressed so as to overcome the balancing force of spring 27. As a result of this compression of spring 21, the latter exerts an upward force which will move base plate 24 and housing 28 upward against the action of spring 27 and the hydraulic load in the damping mechanism. As the load persists, and the force of the housing 28 continues to be exerted against the lower of the liquid containing expansible chambers, liquid will flow from the now contracting chamber 30B through the orifices 33 into chamber 30A which will now expand, causing the housing 28 to move upwardly. Speed of movement of the housing 28 is determined and controlled by the size of orifices 33. This upward movement of housing 28 is possible by virtue of the spaces 40' and the elongated slots 36 which permit relative movement between housing 28 and crosshead 35 to which the hydraulic chambers are connected.

This relative upward movement of housing 28 will move the valve actuating rod 44 upwardly, and slide valve 53 upwardly sufficiently to uncover the air inlet port 48' and admit additional air under pressure into the air spring 10. This additional air must be under a greater pressure than the air already in air spring 10, and will extend the air spring to its initial position, raising the frame members 15 and 16, which action also raises the valve and all of its control mechanism, including the damping means.

During the upward movement of housing 28 to open the air inlet port, base plate 24 has also moved up and spring 27 has been compressed. Hence, as the air spring extends and the upward movement of the frame members 15 and 16 approaches the initial level for the vehicle frame, spring 21 returns to its initial, in balance position, while spring 27 which is now under greater compression than spring 21, forces base plate 24 and housing 28 downwardly to their initial positions, transferring the liquid which moved into the upper chamber 30A back into the lower chamber 30B, and sliding valve 53 downwardly to cover inlet port 48', thus stopping the flow of additional air and maintaining the original position of the air spring. The two centering springs 31 in the chambers 30A and 30B assist in returning the crosshead 35 to center position when equilibrium is reached, thus adding to the stability of the device.

If the static load on the vehicle suspension is decreased, the frame members 15 and 16 move upwardly, extending air spring 10, and moving upwardly the valve and its control mechanism, including the damping means. Since the lower end of spring 21 is secured to plate 17, this spring now is extended and the previous balance between springs 21 and 27 is overcome by the force exerted downwardly by spring 27. This downward force of spring 27 will move downwardly base plate 24 and housing 28 against the action of the hydraulic load in the damping mechanism. As the decrease in static load continues, and the force of housing 28 continues to be exerted against the upper expansible chamber, liquid will flow from the now contracting chamber 30A into chamber 30B which will now expand, causing the housing 28 to move downwardly. Again the speed of motion of housing 28 is determined and controlled by the size of orifices 33. The downward relative movement, at this time, of housing 28 with respect to the crosshead 35 is possible because of the spaces 40' and the slots 36.

This relative downward movement of housing 28 will pull the actuating rod 44 and valve 53 downwardly enough to uncover the exhaust port 49' to permit the escape of air from within the air spring. As the pressure within the air spring is reduced, the frame members 15 and 16 will lower and return the air spring to its initial position, and at the same time lower as a unit, the valve and its control mechanism, including the damping means. As the frame members move down toward their initial position, the force exerted upward by spring 21 becomes greater than the downward force of spring 27, and moves base plate 24 and housing 28 upwardly to their initial position, which action transfers the liquid which moved into the lower chamber 30B back into the upper chamber 30A, and moves valve 53 upward into position closing the exhaust port 49', so as to again maintain the original position of the air spring. The springs 31 will again function as previously described in connection with the operation of the device with an increased static load.

When a vehicle equipped with a suspension system according to the invention is driven over rough roads with no change in the static loading, the vehicle wheels will move up and down over bumps and into holes in the road. This causes the actuating spring 21 to quickly become compressed or extended as the case may be. However, the various components of the valve and its control means will not react to admit or exhaust air because of the damping or time delay effect of the chambers 30A and 30B upon movement of the housing 28. Thus, the admission of additional air to or the exhaust of air from the air spring 10 will not occur until a force is maintained in one direction for a predetermined period of time which will be controlled by the size of orifices 33. It will be found desirable to choose springs 21 and 27, and orifices 33, which provide a time lag of about 7 seconds before the housing 28 will move from the normal or middle position to actuate the sliding valve 53. However, the time delay period may be selected anyplace within the preferred range of from 1 to 20 seconds.

A shut-off valve (not shown) can be provided in the exhaust line 51 so that an operator can shut off the line when raising the vehicle by a bumper jack to remove a tire.

While a preferred embodiment of the invention has been shown it will be apparent that changes and modifications, other than those specifically noted herein, could be made without departing from the basic principles of the invention. Therefore, the annexed claims are intended to embody therein changes of such nature.

What is claimed is:

1. A pneumatic suspension system for a vehicle having a frame member disposed apart from an axle comprising, an expansible bellows containing a cushion of air interposed between said frame member and axle, a first compression spring extending longitudinally into the interior of said bellows from said axle, a second compression spring extending longitudinally into the interior of said bellows from said frame member, a damping means positioned within said second spring and having a radial plate interposed between said springs and movable longitudinally of said bellows in response to the resultant force of said springs, an air chamber above said frame member and damping means and communicating with the interior of said bellows, an air inlet port and an air outlet port leading to said chamber, valve means within said chamber selectively controlling passage of air through said ports, and connections between said damping means and said valve means to operate the latter in response to movement of said damping means.

2. A pneumatic suspension system for a vehicle having a frame member disposed apart from an axle comprising, an expansible bellows containing a cushion of air interposed between said frame member and axle, a first compression spring extending longitudinally into the interior of said bellows from said axle, a second compression spring extending longitudinally into the interior of said bellows from said frame member, a plate interposed between said springs and movable longitudinally of said bellows in response to the resultant force of said springs, a housing within said second spring and affixed to said plate, said housing having elongated lateral openings in opposite walls thereof, brackets depending from said frame member into said bellows outwardly of said housing, a crosshead extending through said housing and said openings transversely of said bellows and having its ends secured to said brackets, said crosshead having a central transverse bore therethrough and being of less width than the length of said openings so as to allow relative vertical movement between said crosshead and said housing, a pair of opposed liquid filled expansible chambers disposed longitudinally within said housing on opposite sides of said crosshead and having reduced inner ends connected to the bore of said crosshead so as to form a hermetically sealed liquid system within said chambers, at least one of said inner ends having a small diameter orifice therein to restrict transfer of liquid from one of said chambers to the other upon relative movement of said housing with respect to said crosshead to dampen movement of said housing, an air supply and exhaust control means for said bellows above said frame member, and connections between said housing and said air control means to operate the latter in response to movement of said housing.

3. A pneumatic suspension system for a vehicle having a frame member disposed apart from an axle comprising, an expansible bellows containing a cushion of air interposed between said frame member and axle, a first compression spring extending from said axle longitudinally into the interior of said bellows, a second compression spring extending from said frame member longitudinally into the interior of said bellows, a plate interposed between said springs and movable longitudinally of said bellows in response to the resultant force of said springs, a housing secured at its lower end to and centrally of said plate to be movable therewith, said housing having elongated lateral openings in opposite walls thereof, brackets depending from said frame member into said bellows outwardly of said housing, a crosshead extending laterally through said housing and said openings and secured at its ends to said brackets, said crosshead having a central transverse bore therethrough and being of less width than the length of said openings so as to allow relative vertical movement between said crosshead and said housing, a pair of opposed liquid filled expansible chambers disposed longitudinally within said housing on opposite sides of said crosshead and having reduced inner ends connected to the bore of said crosshead so as to form a hermetically sealed liquid system within said chambers, at least one of said inner ends having a small diameter orifice therein to restrictively transfer liquid from one of said chambers to the other upon relative movement of said housing with respect to said crosshead to dampen movement of said housing, an air chamber above said frame member and housing and communicating with the interior of said bellows, an air inlet port and an air outlet port leading to said air chamber, valve means within said air chamber selectively controlling passage of air through said ports, and connections between said housing and said valve means extending through said frame member to actuate said valve means in response to movement of said housing.

4. A pneumatic suspension system for a vehicle having a frame member disposed parallel to and substantially vertically above an axle comprising, an expansible bellows containing a cushion of air hermetically secured between said frame channel and axle, a conical compression spring having its narrow end secured to said axle and extending longitudinally upward within said bellows, a substantially cylindrical spring extending longitudinally downward from said frame member within said bellows, a substantially annular plate interposed between said springs and movable longitudinally of said bellows in response to the resultant force of said springs, a housing having a substantially rectangular cross section affixed at its lower end to said plate and responsive to movement thereof, said housing having elongated lateral openings in opposite walls thereof, a pair of spaced brackets depending from said frame member into said bellows outwardly of said housing and within said cylindrical spring, a crosshead extending laterally through said housing and said openings and secured at its ends to said brackets, said crosshead having a central transverse bore therethrough and being of less width than the length of said openings so as to allow relative vertical movement between said crosshead and said housing, a pair of opposed liquid filled expansible chambers disposed longitudinally within said housing on opposite sides of said crosshead and having reduced inner ends secured in the bore of said crosshead to form a hermetically sealed liquid system within said chambers, said inner ends each having a small diameter orifice therein to restrictively transfer liquid from one of said chambers to the other upon relative movement of said housing with respect to said crosshead to provide a controlled time delay for movement of said housing, an air chamber above said frame member and housing and communicating with the interior of said bellows, an air inlet port and an air outlet port leading to said air chamber, a sliding disc valve within said air chamber selectively controlling passage of air through said ports, and connections between said housing and said valve extending vertically from said housing through said frame member to actuate said valve in response to movement of said housing.

5. In a pneumatic suspension system for a vehicle having a frame member disposed above an axle member, an air spring interposed between said members to resiliently support said frame member at a predetermined height above said axle member, a valve for admitting and exhausting air from said air spring as the height of said frame member changes downwardly and upwardly respectively, actuating means connected at one end to said valve, opposed coil springs operable within said air spring to operate said valve actuating means and mechanism to delay the operation of said valve actuating means for a predetermined period of time, said mechanism comprising a plate interposed between said coil springs and movable longitudinally of said air spring in response to the resultant force of said coil springs, a housing affixed to said plate, said housing connected to the other end of said actuating means and having elongated lateral openings in opposite walls thereof, spaced brackets depending from said frame member into said air spring outwardly of said housing, a crosshead extending transversely through said housing and said openings and having its ends secured to said brackets, said crosshead having a central transverse bore therethrough and being of less width than the length of said openings so as to allow relative vertical movement between said crosshead and said housing, a pair of opposed liquid filled expansible chambers disposed longitudinally within said housing on opposite sides of said crosshead and having reduced inner ends connected to the bore of said crosshead so as to form a hermetically sealed liquid system within said chambers, at least one of said inner ends having a small diameter orifice therein to restrict transfer of liquid from one of said chambers to the other upon relative movement of said housing with respect to said crosshead.

6. In a pneumatic suspension system for a vehicle having a frame member disposed above an axle member, an air spring interposed between said members to resiliently support said frame member at a predetermined height above said axle member, a valve for admitting and exhausting air from said air spring as the height of said frame member changes downwardly and upwardly respectively, actuating means connected at one end to said valve, opposed coil springs operable within said air spring to operate said valve actuating means and mechanism to delay the operation of said valve actuating means for a predetermined period of time, said mechanism comprising a plate interposed between said coil springs and movable longitudinally of said air spring in response to the resultant force of said coil springs, a housing affixed to said plate, said housing connected to the other end of said actuating means and having elongated lateral openings in opposite walls thereof, spaced brackets depending from said frame member into said air spring outwardly of said housing, a crosshead extending transversely through said housing and said openings and having its ends secured to said brackets, said crosshead having a central transverse bore therethrough and being of less width than the length of said openings so as to allow relative vertical movement between said crosshead and said housing, a pair of opposed liquid filled expansible chambers disposed longitudinally within said housing on opposite sides of said crosshead and having reduced inner ends connected to the bore of said crosshead so as to form a hermetically sealed liquid system within said chambers, at least one of said inner ends having a small diameter orifice therein to restrictively transfer liquid from one of said chambers to the other upon relative movement of said housing with respect to said crosshead, an outwardly extending lateral flange on the lower ends of each of said brackets, an inwardly directed lateral flange spaced from and carried by said plate in overlapping relation with each of said first named flanges, the spaces between said inwardly directed lateral flanges and said plate being greater than the thickness of said first named flanges so as to allow limited relative vertical movement between said plate and said brackets.

References Cited in the file of this patent
UNITED STATES PATENTS

| | | |
|---|---|---|
| 2,361,575 | Thompson | Oct. 31, 1944 |
| 2,620,182 | Marston | Dec. 2, 1952 |
| 2,622,872 | Wettstein | Dec. 23, 1952 |
| 2,670,201 | Rossman | Feb. 23, 1954 |